A. L. WHITE & T. H. WEBB.
FLEXIBLE PIPE JOINT.
APPLICATION FILED APR. 18, 1917.
1,279,806.
Patented Sept. 24, 1918.
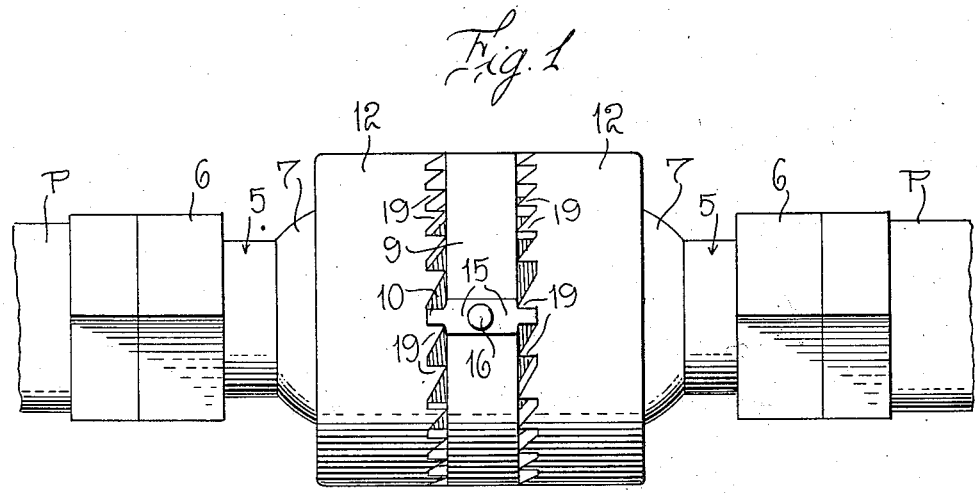
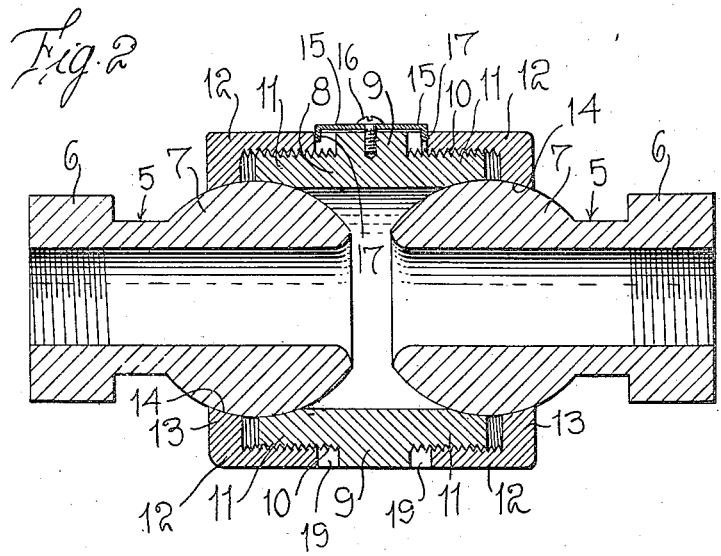
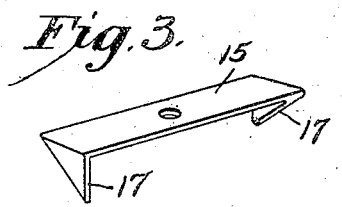
Inventors
ALBERT L. WHITE and
THOMAS H. WEBB
By Watson E. Coleman
Attorney

UNITED STATES PATENT OFFICE.

ALBERT L. WHITE AND THOMAS H. WEBB, OF PORTSMOUTH, VIRGINIA.

FLEXIBLE PIPE-JOINT.

1,279,806.

Specification of Letters Patent.

Patented Sept. 24, 1918.

Application filed April 18, 1917. Serial No. 163,066.

*To all whom it may concern:*

Be it known that we, ALBERT L. WHITE and THOMAS H. WEBB, citizens of the United States, residing at Portsmouth, in the county of Norfolk and State of Virginia, have invented certain new and useful Improvements in Flexible Pipe-Joints, of which the following is a specification, reference being had to the accompanying drawings.

This invention relates to an improved flexible pipe joint and has for its primary object to provide a universal pipe joint or connection for steam, air, or water pipes, which will permit of the vibration of the pipe sections without leakage at the joint or coupling.

It is another object of our invention to provide in a device of the above character, a female coupling member and male coupling members to which the pipe sections are adapted to be connected, and flanged collars detachably threaded on the ends of the female coupling member, said collars and the ends of the female coupling member affording bearing surfaces for spherical heads on the male coupling member.

It is a further general object of our invention to improve and simplify the construction of pipe joints of the above character, whereby the same may be very easily and quickly assembled and are highly efficient and reliable for the purpose in view.

With the above and other objects in view, our invention consists in the novel features of construction, combination and arrangement of parts to be hereinafter more fully described, claimed and illustrated in the accompanying drawing, in which, Figure 1 is a side elevation of our improved flexible pipe joint;

Fig. 2 is a longitudinal section thereof.

Fig. 3 is a detail perspective view of the locking spring for the rotatable coupling members.

Referring in detail to the drawing, 5 designates the male coupling members, each of which is formed with a flange 6 on one end of polygonal contour for the application of a suitable wrench in connecting said coupling member to or disconnecting it from the pipe section, indicated at P. The other end of the male coupling members 5 is provided with a relatively large ball or spherical-shaped head 7.

8 designates the female coupling member in the form of a sleeve having a central, exterior flange 9 thereon, said sleeve being exteriorly threaded, as at 10, on each side of this flange. At the opposite ends of this sleeve, the interior face thereof is formed with a concave, annular portion 11, the purpose of which will be presently stated.

The collar or sleeve 12 is interiorly threaded for detachable engagement upon each end of the sleeve 8, and each of these collars is provided upon one end with an inwardly extending, annular flange 13. The edge of this flange is also concave, as at 14, on the same radius as the concave faces 11 at the respective ends of the coupling sleeve 8.

A double ended leaf spring 15 is immovably fixed at its center to a radially projecting lug 16 on the flange 9 of the sleeve 8. The ends are freely yieldable and project in opposite directions from said lug and are each provided with a single tooth, indicated at 17, for engagement with the teeth or serrations 19 formed in the edges of the collars 12. The edges of the teeth 17 which are opposed to the inclined edges of the teeth or serrations 19 on the collars 12, are inclined or beveled so that when the inclined edges of the serrations 19 ride against these inclined edges of the teeth 17, the latter will be forced outwardly.

As the collars 12 are threaded inwardly on the sleeve 8, the serrated ends of said collars engage the angular teeth 17 on the ends of the spring plate 15 and force the same outwardly. These teeth returning to their normal positions, coact with the serrated ends of the collars to hold the latter against reverse turning movement. In uncoupling the pipe sections, a suitable implement is inserted under the free ends of the spring plate 15 and the teeth 17 forced outwardly so that the collars 12 may be unthreaded from the sleeve 8.

In assembling the several parts, the collars 12 are first engaged upon the male coupling members 5 and the sleeve 8 arranged between the heads 7 on said coupling members with their concave faces 11 bearing upon the convex periphery of said spherical heads. The collars 12 are then turned and threaded upon the respective ends of the sleeve 10. When these collars are threaded tightly to their set positions as shown in Fig. 2, the end edges of the sleeve 8 will be approximately on a line with the diametrical centers of the heads 7 of the coupling members 5, while the concave faces 14 on the collar flanges 13 will engage upon the heads 7 at a point in spaced relation to the ends of said sleeve and inwardly of the centers of the respective heads. Thus, the coupling members 5 and 8 are securely connected together against all possibility of accidental separation, while at the same time the members 5 to which the pipe sections are connected, may oscillate or rock within the collar flanges 13 and the ends of the sleeve 8. These contacting faces are properly ground so as to absolutely prevent all leakage of the air, steam, water, or other fluid passing through the coupling. It will thus be seen that the device is particularly desirable for use in connection with pipes or conduits carrying fluids under high pressure.

From the foregoing description, taken in connection with the accompanying drawing, the construction, manner of use, and several advantages of the invention will be clearly and fully understood. It will be seen that our improved coupling device is exceedingly simple and durable in practical use, and the several parts thereof may also be easily and quickly assembled or disassembled when it is desired to disconnect the sections of pipe. The flexible joint can, of course, be manufactured in various sizes in accordance with the requirements of the particular purpose for which it is to be used. The device is also susceptible of considerable modification in the form, proportion and arrangement of its several elements and we, therefore, reserve the privilege of adopting all such legitimate changes as may be fairly embodied within the spirit and scope of the invention as claimed.

Having thus fully described our invention, what we desire to claim and secure by Letters Patent is:

A flexible pipe coupling including male coupling members each having a spherical head, a coupling sleeve having interior, concave faces at its opposite ends for engagement of the respective spherical heads therewith, said sleeve at each end being exteriorly threaded, a collar engaged upon each threaded end of the sleeve and having an angular flange for bearing engagement upon the spherical coupling head in spaced relation to the end of the sleeve, and a single locking element secured to the sleeve and having free end portions to coact with the respective collars and hold the latter against reverse turning movement.

In testimony whereof we hereunto affix our signatures in the presence of two witnesses.

ALBERT L. WHITE.
THOS. H. WEBB.

Witnesses:
G. H. TRIMYER,
GEO. A. WHITE.